(12) United States Patent
Martin et al.

(10) Patent No.: US 10,365,153 B1
(45) Date of Patent: Jul. 30, 2019

(54) REDUCING EXTRANEOUS SIGNALS FOR SENSORS

(71) Applicants: Russell Tyler Martin, Peachtree City, GA (US); Jonathan Andrew Whitten, Senoia, GA (US)

(72) Inventors: Russell Tyler Martin, Peachtree City, GA (US); Jonathan Andrew Whitten, Senoia, GA (US)

(73) Assignee: Eaton Intelligent Power Limited, Dublin (IE)

(*) Notice: Subject to any disclaimer, the term of this patent is extended or adjusted under 35 U.S.C. 154(b) by 148 days.

(21) Appl. No.: 15/261,066

(22) Filed: Sep. 9, 2016

(51) Int. Cl.
*G01J 1/00* (2006.01)
*G01J 5/00* (2006.01)
*G01J 1/04* (2006.01)
*G01J 1/02* (2006.01)
*G01J 1/42* (2006.01)

(52) U.S. Cl.
CPC ........... *G01J 1/0418* (2013.01); *G01J 1/0271* (2013.01); *G01J 1/4228* (2013.01)

(58) Field of Classification Search
CPC .......... H01J 5/02; G01J 1/0418; G01J 1/4228; G01J 1/0271
USPC .......................................................... 250/239
See application file for complete search history.

(56) References Cited

U.S. PATENT DOCUMENTS

| | | | | |
|---|---|---|---|---|
| 5,731,752 A | * | 3/1998 | Wood | H03B 19/18 227/123 |
| 6,717,126 B1 | * | 4/2004 | Glenn | H01L 27/14618 250/208.1 |
| 7,943,894 B2 | * | 5/2011 | Blauvelt | G02B 6/125 250/216 |
| 2013/0181131 A1 | * | 7/2013 | Holenarsipur | G01S 17/026 250/338.1 |
| 2013/0222172 A1 | * | 8/2013 | Sentelle | G01S 13/888 342/22 |
| 2015/0310953 A1 | * | 10/2015 | Okamura | G01T 1/2002 250/487.1 |

* cited by examiner

*Primary Examiner* — Seung C Sohn
(74) *Attorney, Agent, or Firm* — King & Spalding LLP

(57) ABSTRACT

A signal barrier for a sensor device can include at least one wall that forms an inner space, wherein the at least one wall comprises a material for reducing an amount of a signal from entering the inner space, wherein the at least one wall is configured to be disposed adjacent to a transceiver element of the sensor device, wherein the transceiver element is directed to the inner space.

14 Claims, 14 Drawing Sheets

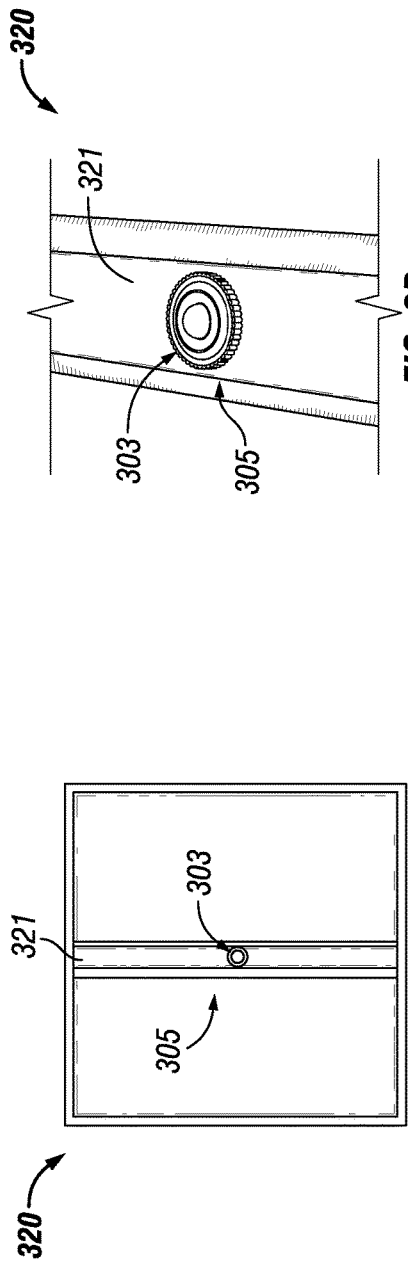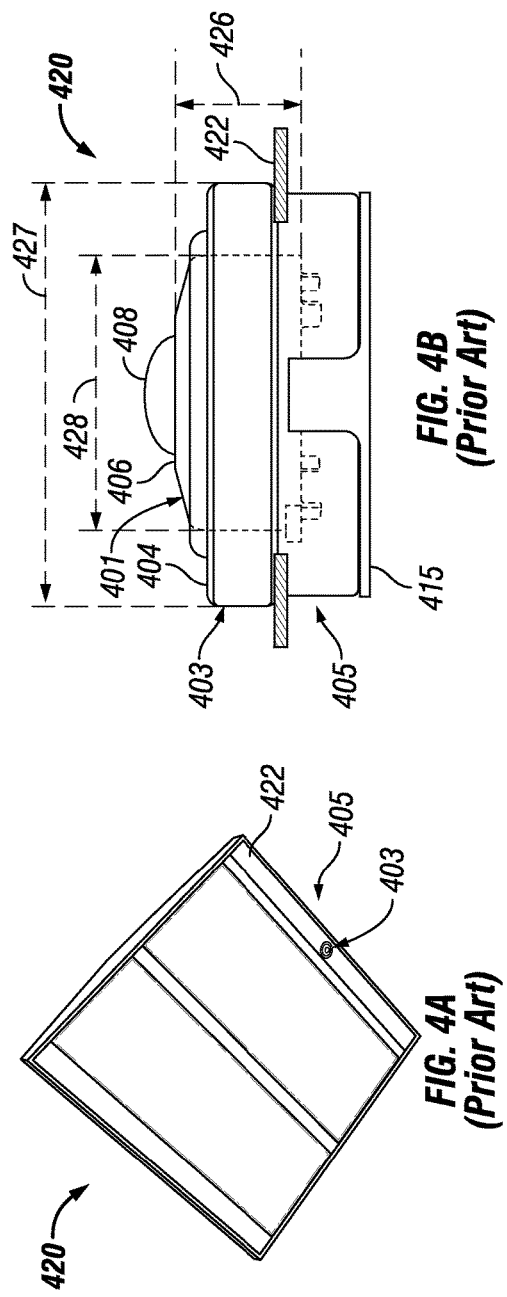

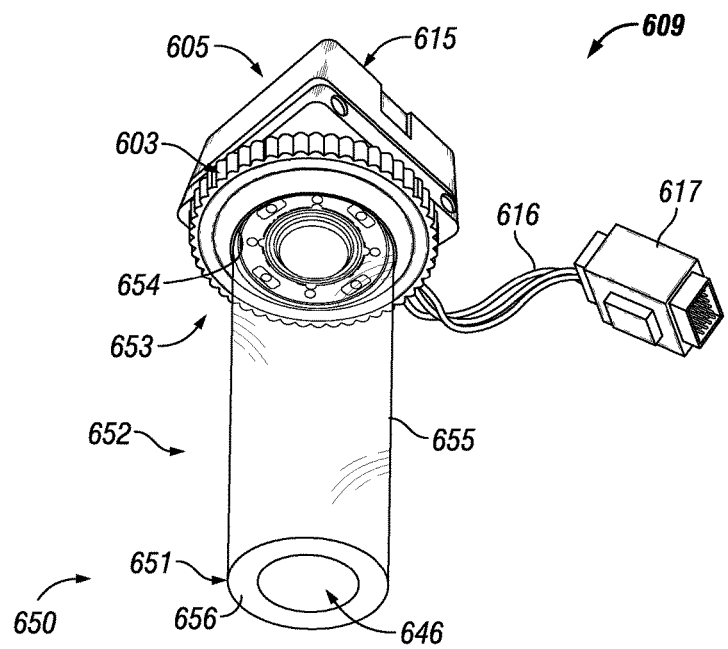
FIG. 6
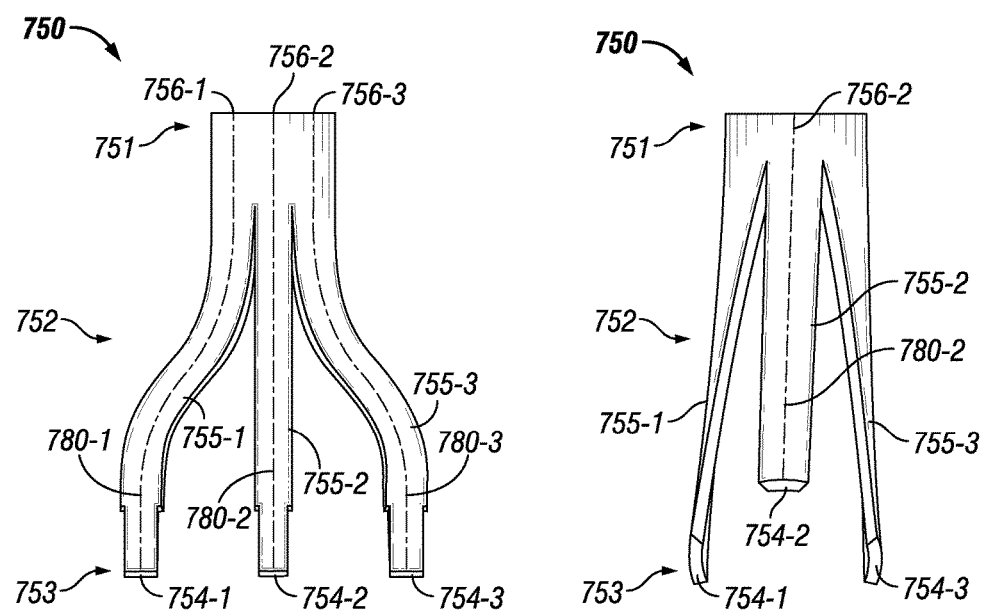
FIG. 7A
FIG. 7B

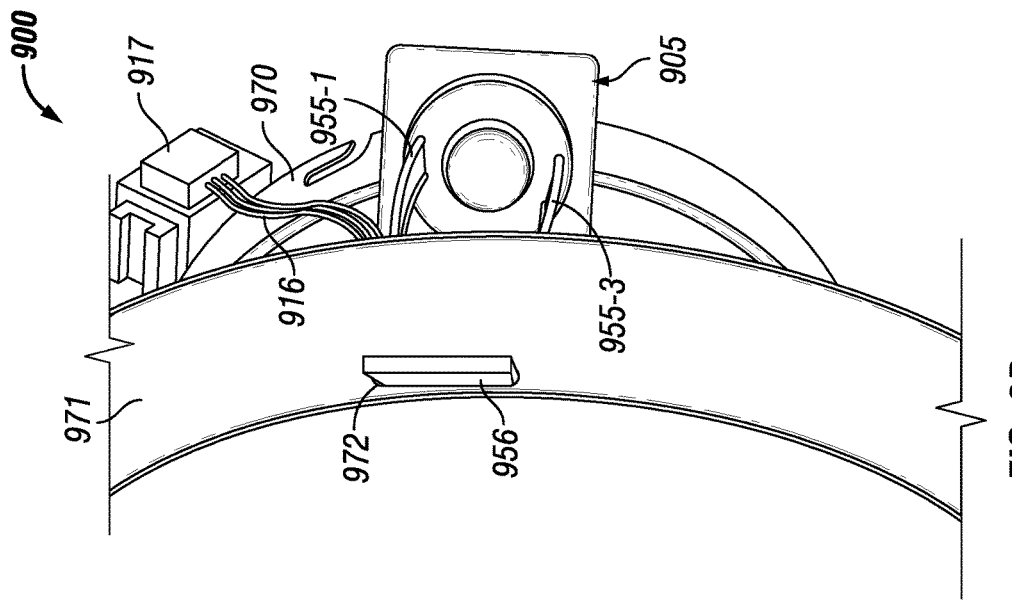
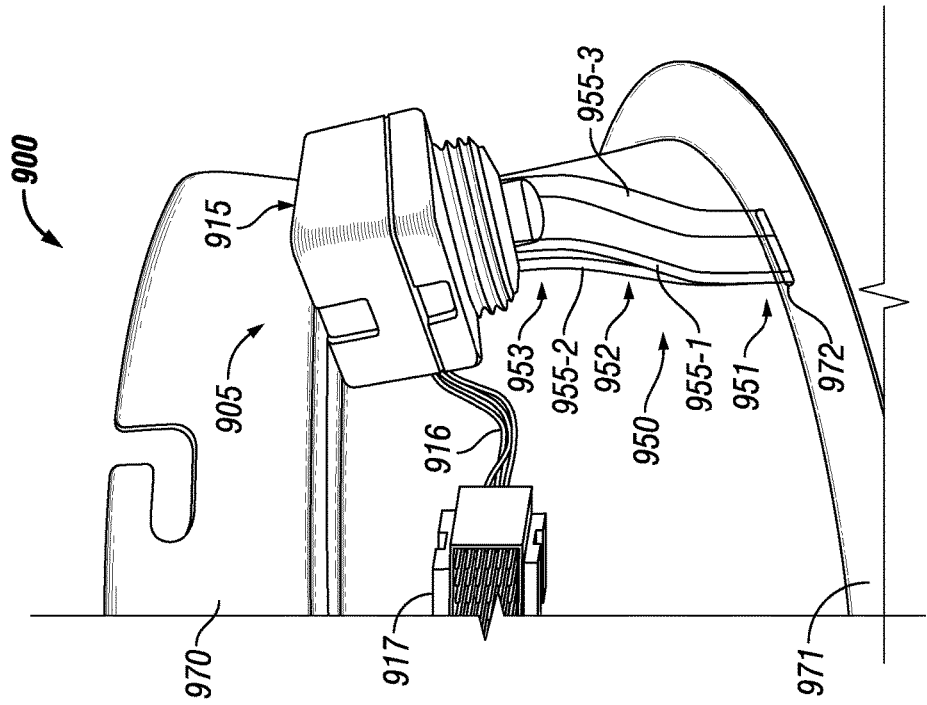
FIG. 9B
FIG. 9A

REDUCING EXTRANEOUS SIGNALS FOR SENSORS

TECHNICAL FIELD

Embodiments described herein relate generally to light sensor devices used in spaces, and more particularly to systems, methods, and devices for reducing signals detected by sensors.

SUMMARY

In general, in one aspect, the disclosure relates to a signal barrier for a sensor device. The signal barrier can include at least one wall that forms an inner space, where the at least one wall includes a material for reducing an amount of a signal from entering the inner space, where the at least one wall is configured to be disposed adjacent to a transceiver element of the sensor device, where the transceiver element is directed to the inner space.

In another aspect, the disclosure can generally relate to a sensor device. The sensor device can include a first sensor having a first transceiver element that receives a first signal from a first external source. The sensor device can also include a first component that generates a second signal, where the second signal is transmitted proximate to the first transceiver element. The sensor device can further include a first signal barrier disposed proximate to the first transceiver element. The sensor device can include at least one first wall that forms a first inner space, where the at least one first wall includes a first material for reducing a first amount of the second signal from entering the first inner space, where the first transceiver element is directed to the first inner space.

In yet another aspect, the disclosure can generally relate to a signal device. The signal device can include a first component that includes a first transceiver element that sends a first signal to an external location. The signal device can also include an signal barrier disposed proximate to the first transceiver element. The signal barrier can include at least one wall that forms a inner space, where the at least one wall includes a material for redirecting a first amount of the first signal from the inner space to the external location, where the first transceiver element is directed to the inner space.

These and other aspects, objects, features, and embodiments will be apparent from the following description and the appended claims.

BACKGROUND

Sensor devices are used in a variety of applications. For example, sensor devices are used for energy management. In such a case, the sensor device can be placed in a space (e.g., a room) and can measure one or more of a number of parameters within the space. Such parameters can include, but are not limited to, an amount of ambient light and movement. Thus, a sensor device can include one or more of a number of sensors that read some form of signal (e.g., light waves). Examples of sensors that are included in a sensor device can include, but are not limited to, a photo sensor, a light sensor, and an infrared detector. In addition, a sensor device can include one or more of a number of other components. For example, a sensor device can include an indicating light to let a user know whether the sensor device is operating properly. As a result, one or more light sources can be co-located, along with a light sensor, in a sensor device.

BRIEF DESCRIPTION OF THE DRAWINGS

The drawings illustrate only example embodiments of reducing signals for sensors and are therefore not to be considered limiting of its scope, as reducing signals for sensors may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 3A and 3B show a light fixture with a sensor device currently known in the art.

FIGS. 4A and 4B show another light fixture with a sensor device currently known in the art.

FIG. 6 shows another signal guide for a sensor device.

FIGS. 7A and 7B show yet another signal guide for a sensor device.

FIGS. 9A-9C show a light fixture with a sensor device having a signal guide.

DETAILED DESCRIPTION OF EXAMPLE EMBODIMENTS

Figure 1A:
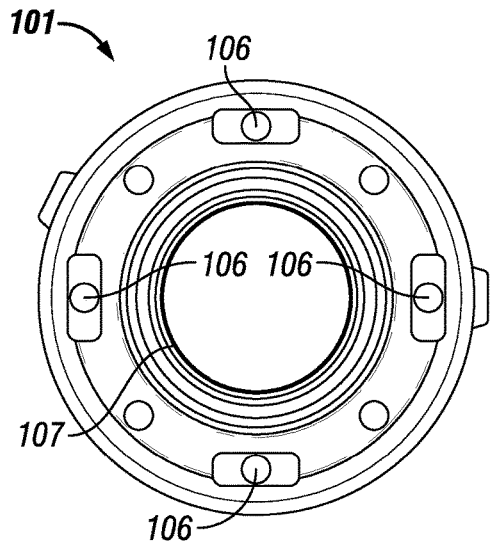
FIGS. 1A-1C show various portions of a sensor device currently known in the art.
Figure 1C:
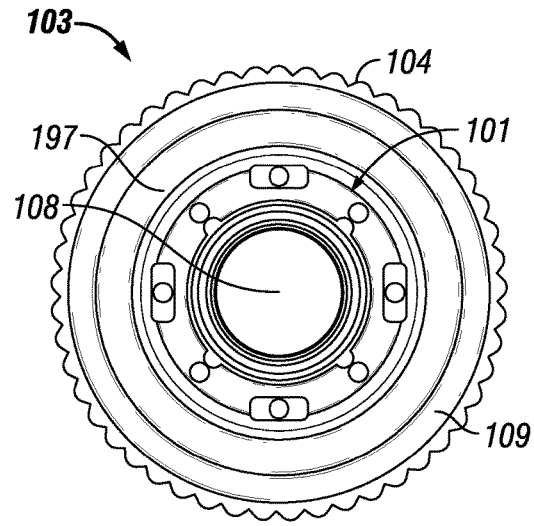
Figure 1B:
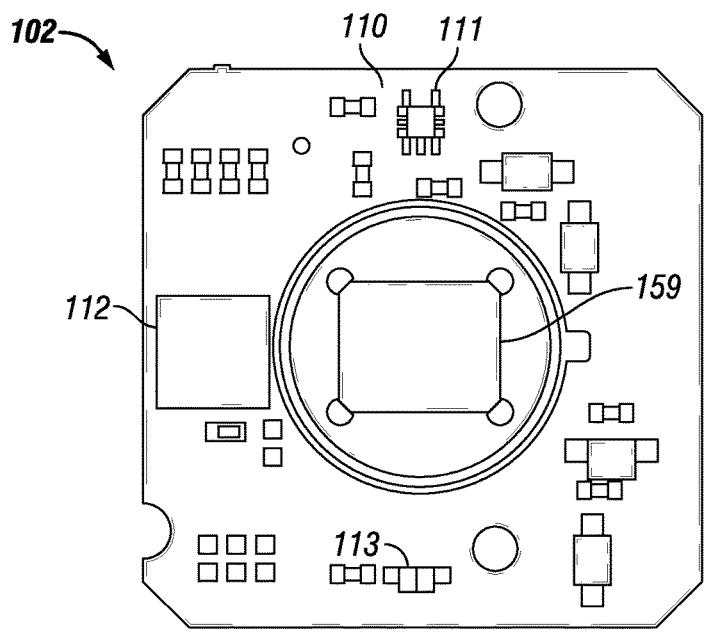

The example embodiments discussed herein are directed to systems, apparatuses, and methods of reducing signals for sensors. While example embodiments described herein are used with sensor devices that are part of lighting systems, example embodiments can also be used in any of a number of other types of systems. Examples of such other systems can include, but are not limited to, security systems, fire protection systems, and emergency management systems. Thus, example embodiments are not limited to use with lighting systems.

Further, while example embodiments described herein are directed for use with light sensors, example embodiments can also be used with sensors that measure other types of signals that can be influenced by extraneous sources and/or whose communication can be diluted by loss of an amount of signal. Examples of other types of signals that can be used with example embodiments described herein can include, but are not limited to, microwaves, radio frequency waves, infrared waves, electromagnetic waves, energy waves, sound waves, magnetic waves, control signals, and images.

Example embodiments (or portions thereof) of signal barriers can be made of one or more of a number of materials (e.g., metal, plastic, rubber, ceramic, wood) to reduce or eliminate signals. Such material can have any of a number of properties. Such properties can include, but are not limited to, reflectiveness, absorption, thermal insulation, thermal conductivity, and electrical insulation.

As described herein, a user can be any person that interacts with sensor devices. Examples of a user may include, but are not limited to, a consumer, an electrician, an engineer, a mechanic, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure. For example, features shown in one or more figures or described with respect to one embodiment can be applied to another embodiment associated with a different figure or description.

Example signal barriers, or portions thereof, described herein can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, positioning, mounting, fastening, securing, or other similar terms. Such terms are merely meant to distinguish various elements and/or features within a component or device and are not meant to limit the capability or function of that particular element and/or feature. For example, a feature described as a "coupling feature" can couple, position, mount, secure, fasten, abut against, and/or perform other functions aside from merely coupling.

A coupling feature (including a complementary coupling feature or a positioning feature) as described herein can allow one or more components and/or portions of an example signal barrier to become mechanically coupled, directly or indirectly, to another portion or component of a sensor device. A coupling feature can include, but is not limited to, a portion of a hinge, an aperture, a recessed area, a protrusion, a snap, a clamp, a slot, a spring clip, a tab, a detent, and mating threads. One portion of an example signal barrier can be coupled to another component of a sensor device by the direct use of one or more coupling features.

In addition, or in the alternative, a portion of an example signal barrier can be coupled to another component of a sensor device using one or more independent devices that interact with one or more coupling features disposed on a component of the sensor device. Examples of such devices can include, but are not limited to, a pin, a hinge, a fastening device (e.g., a bolt, a screw, a rivet), a clamp, and a spring. One coupling feature described herein can be the same as, or different than, one or more other coupling features described herein. A complementary coupling feature or a positioning feature as described herein can be a coupling feature that mechanically couples, directly or indirectly, with another coupling feature.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In certain example embodiments, a light fixture or other device that includes one or more sensor devices that use example embodiments (or portions thereof) described herein can meet one or more of a number of standards, codes, regulations, and/or other requirements established and maintained by one or more entities. Examples of such entities include, but are not limited to, Underwriters' Laboratories (UL), the Institute of Electrical and Electronics Engineers (IEEE), International Electrotechnical Commission (IEC) and the National Fire Protection Association (NFPA). For example, wiring (the wire itself and/or the installation of such wire) that electrically couples a sensor device for with a light fixture may fall within one or more standards set forth in the National Electric Code (NEC). In such a case, the NEC defines Class 1 circuits and Class 2 circuits under various Articles, depending on the application of use.

Example embodiments for reducing signals for sensors will be described more fully hereinafter with reference to the accompanying drawings, in which example embodiments for reducing signals for sensors are shown. Reducing signals for sensors may, however, be embodied in many different forms and should not be construed as limited to the example embodiments set forth herein. Rather, these example embodiments are provided so that this disclosure will be thorough and complete, and will fully convey the scope for reducing signals for sensors to those of ordinary skill in the art. Like, but not necessarily the same, elements (also sometimes called components) in the various figures are denoted by like reference numerals for consistency.

Terms such as "first", "second", "top", "bottom", "side", "back", "front", "inner", "outer", "left", "right", "base", "proximal", and "distal" are used merely to distinguish one component (or part of a component or state of a component) from another. Such terms are not meant to denote a preference or a particular orientation, and are not meant to limit embodiments for reducing signals for sensors. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2A:
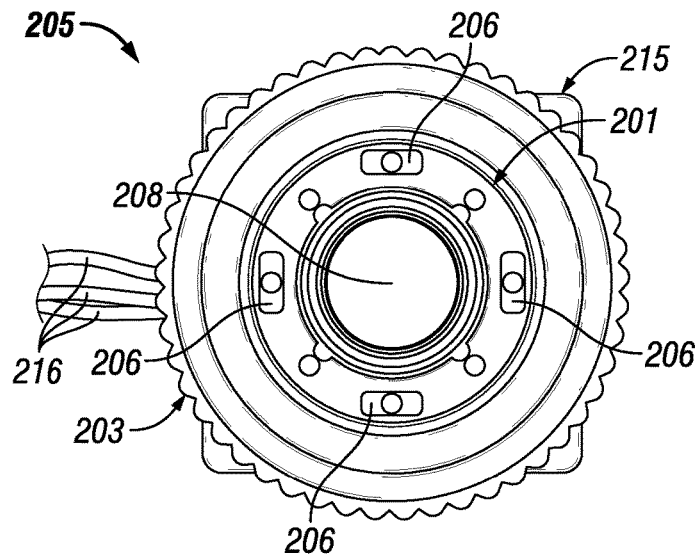
FIGS. 2A and 2B show a sensor device currently known in the art.
Figure 2B:
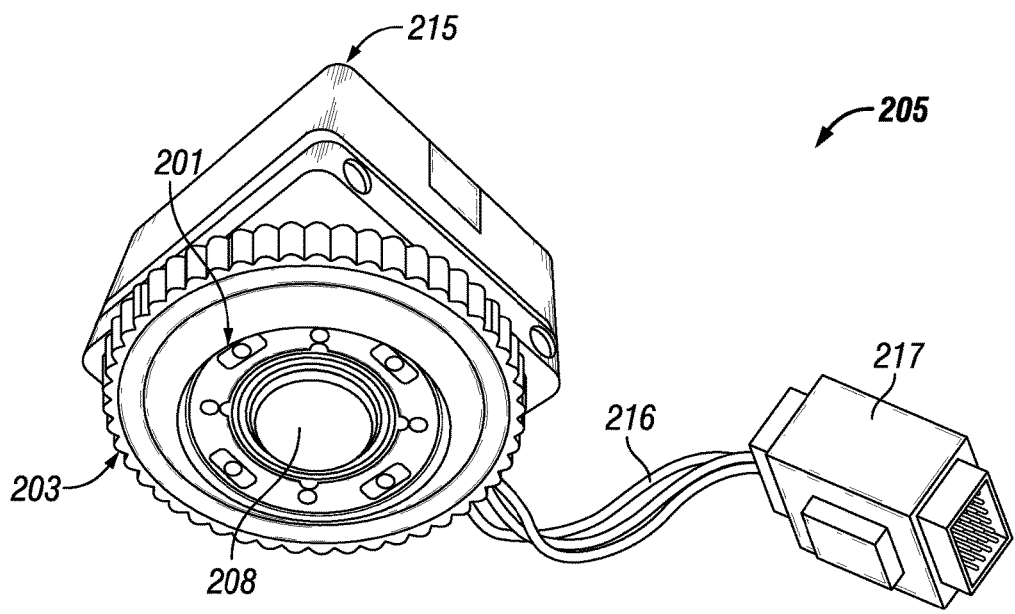

FIGS. 1A-2B show various portions of a sensor device 205 currently known in the art. Specifically, FIG. 1A shows a top view of a cover 101 of the sensor device 205. FIG. 1B shows a top view of a circuit board assembly 102 of the sensor device 205. FIG. 1C shows a top view of a distal assembly 103 of the sensor device 205. FIG. 2A shows a top view of the sensor device 205, and FIG. 2B shows a top-side perspective view of the sensor device 205. The cover 101 can be part of the sensor device 205 currently known in the art. Alternatively, a cover 101 can be a separate component from a sensor device.

Referring to FIGS. 1A-2B, the circuit board assembly 102 is disposed within the housing 215 of the sensor device 205. The circuit board assembly 102 can include a circuit board 110 on which are disposed one or more of a number of components. Examples of such components can include, but are not limited to, a resistor, a capacitor, an integrated circuit, an occupancy sensor 159 (also called, for example, a passive infrared detector 159), a sensor (e.g., a photo sensor 111, an infrared detector 112 (also called, for example, an infrared receiver 112)), and a light source (e.g., light-emitting diode (LED) assembly 113).

For purposes of this application, one or more of the components that emit an output (e.g., from the LED assembly 113) can be called, or can include, a transceiver element (also called more simply a transceiver herein). As defined herein, the transceiver element of a sensor can send and/or receive signals. In other words, as an example, a transmitter can be considered a transceiver element herein. Some of the components of a circuit board assembly 102 can emit a signal (e.g., visible light, infrared waves, magnetic waves) that can interfere with the signals received by a sensor (e.g., the photo sensor 111, the infrared detector 112) and/or with signals sent by a sensor (e.g., the LED assembly).

The housing 215 of the sensor device 205 is disposed adjacent to the distal assembly 103. The distal assembly 103 includes an inner body 197 and a trim 104 that is movably (e.g., threadably) coupled to the inner body 197. The trim 104 can be used to hold one or more components of the sensor device 205 in place. For example, the trim 104 can be used to retain the cover 101 currently known in the art. The cover 101 can be used to help transmit signals between the ambient environment (outside the sensor device 205) and one or more of the sensors disposed within the sensor device 205. The cover 101 can include a number (e.g., one, two, three) of holes 106 that aligned with an transceiver element of a sensor (e.g., photo sensor 111, infrared detector 112, LED assembly 113) disposed on the circuit board 110. In this example, the cover 101 has four separate holes 106 (three of which are actually used) that are located at different points around the aperture 107 disposed in the middle of the cover 101.

The sensor device 205 is generally not large, and so a number of components (e.g., resistors, diodes, capacitors, integrated circuits) and sensors (e.g., photo sensor 111, infrared detector 112, LED assembly 113) are disposed within a very limited space. Further, the housing 215 of the sensor device 205 encloses most, if not all, of these components and sensors. As a result, a signal and/or energy emitted by one component and/or sensor within the housing 215 of the sensor device 205 can skew the measurements made by a sensor within the housing 215 of the sensor device 205.

A sensor device can be mounted in any of a number of places relative to an electrical device (e.g., a light fixture). For example, FIGS. 3A-4B show examples of how a sensor device can be integrated with an electrical device. Specifically, FIG. 3A shows a bottom view of an electrical device 320 (in this case, a light fixture) having a sensor device 305 disposed on a center panel 321. FIG. 3B shows a bottom-side perspective view that details the sensor device 305 of FIG. 3A disposed on the center panel 321. FIG. 4A shows a bottom-side perspective view of another electrical device 420 (also a light fixture in this case) having a sensor device 405 disposed on an outer panel 422. FIG. 4B shows a cross-sectional side view that details the sensor device 405 of FIG. 4A disposed on the outer panel 422.

The sensor device 305 of FIGS. 3A and 3B and the sensor device 405 of FIGS. 4A and 4B are substantially the same as the sensor device 205 of FIGS. 1A-2B. Referring to FIGS. 1A-4B, the distal assembly 303 of the sensor device 305 of FIGS. 3A and 3B and the digital assembly 403 of the sensor device 405 of FIGS. 4A and 4B are visible to a user. As FIGS. 3A-4B show, the footprint of the distal assembly 303 and the distal assembly 403 is large relative to the size of the rest of the electrical device 320 and the electrical device 420, respectively.

As shown in FIG. 4B, the trim 404 of the distal assembly 405 is used to secure the rest of the distal assembly 405 to the outer-facing surface of the outer panel 422 and to secure the housing 415 to the inner-facing surface of the outer panel 422. The trim 404 has a width 427 (e.g., 1.3 inches) and a height (which can be substantially similar to the height 426 of the cover 401). The cover 401 also has a width that is less than the width 427 of the trim 404.

When a sensor device 405 is relatively small (e.g., trim 404 with a width 427 of less than 1.5 inches), the sensor device 405 can be called a mini sensor device (or, more simply, a mini sensor). While the examples shown in the figures are directed to mini sensor devices, example embodiments can be used with sensor devices of any size, including relatively large sensor devices.

Figure 5A:
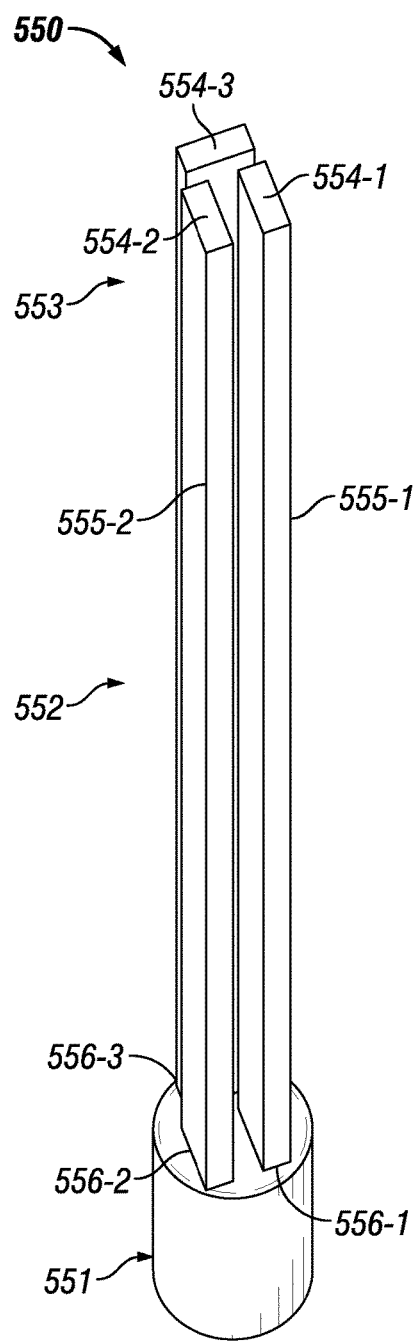
FIGS. 5A and 5B show a signal guide for a sensor device.
Figure 5B:
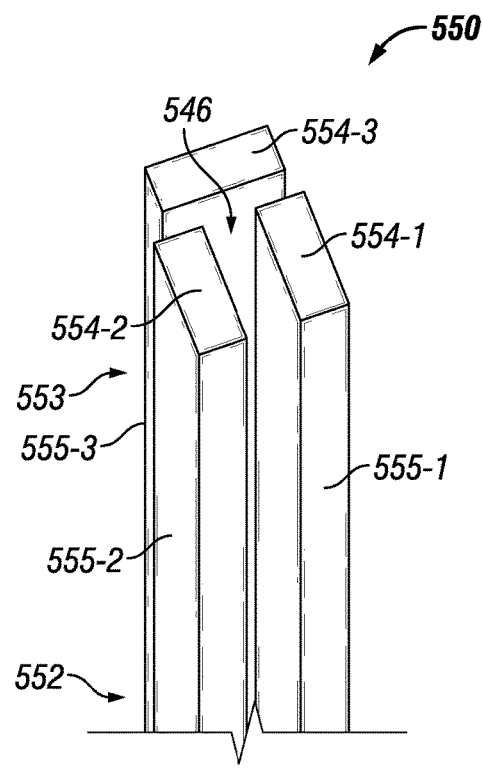

A sensor device can be located completely behind (as opposed to only partially behind) a surface (e.g., a trim of a light fixture). In other words, a sensor device can be substantially hidden from view of a user. By using a signal guide, as shown in FIGS. 5A-9C below, a sensor device can be located some distance from an opening in an electrical device through which signals can be sent and/or received. Referring to FIGS. 1A-9C, FIGS. 5A and 5B show a first example of a signal guide 550. Specifically, FIG. 5A shows a bottom-side perspective view of a signal guide 550 for a sensor device. FIG. 5B shows a detailed bottom-side perspective view of a distal end of the signal guide 550 of FIG. 5A.

In this case, the signal guide 550 has a base 553 that is configured to be disposed proximate to a component (e.g., a trim) of an electrical device (e.g., a light fixture) for which the sensor device is used. At the opposite end of the signal guide 550, there are three proximal apertures 554 (proximal aperture 554-1, proximal aperture 554-2, and proximal aperture 554-3) that are configured to be disposed adjacent to one or more of the transceiver elements mounted on the circuit board assembly of the sensor device. The proximal apertures 554 of the signal guide 550 can part of one or more channels, where each channel is disposed within a body 552 (e.g., body 552-1, body 552-2) that extends from and is coupled to the proximal end of the base 553. Each body 552 can have a distal end coupled to the base 553 and include a distal aperture 556 that receives an energy (e.g., light, sound) wave or other type of signal from a transceiver element through the proximal aperture 553 and the main channel 555, and send the signal through the base 553. In addition, or in the alternative, the distal aperture 556 can transmit an energy wave (or other type of signal) that is received from the base 553, and transmit the signal through the main channel 555 and the proximal aperture 554 to the transceiver element of a sensor device.

The base 553 can be configured so that energy waves or other types of signals emitted by a transceiver element can be directed in some way to the distal apertures 556 of a channel of the signal guide 550. Alternatively, one or more distal apertures 556 can be incorporated within or at a distal end of the base 553. In such a case, a channel can extend into the base 553 to a point where the associated distal aperture 556 is located within the base 553.

In addition, each channel can have a proximal end 553 with a proximal aperture 554, where the proximal end 553 is disposed at the end of the body 552 opposite the base 553. Each proximal aperture 554 can transmit an energy wave or other type of signal that originates from a transceiver element and is transmitted through the main channel 555 and the distal aperture 556 to the base 553. In addition, or in the alternative, the proximal aperture 554 can receive an energy wave or other type of signal from an ambient environment (received through the base 553, the distal aperture 556, and the main channel 555) and transmit the energy wave or other type of signal to the transceiver element of a sensor device.

Each body 552 can include a main channel 555 that runs between the proximal aperture 554 at the base 553 and the distal aperture 556 of the distal end 551. The signal guide 550 can have any of a number of channels. In this case, the signal guide 550 has three segments or channels, where each segment (or portion thereof) is designated by a "-#" at the end of each numerical designation. For example, the proximal aperture of segment 3 has a numerical designation of 554-3. A segment can have a single channel (e.g., one proximal aperture 554, one main channel 555, and one distal aperture 556) running therethrough that is devoted the transfer of energy waves or other types of signals with a single sensor. Alternatively, a segment can have multiple channels (e.g., four proximal apertures 554, four main channels 555, and two distal apertures 556) running therethrough, where each channel (or portion thereof) is dedicated to a single sensor device or multiple sensor devices.

When the signal guide 550 has multiple channels, one or more of the channels can be physically separated from the remainder of the segments. In such a case, a gap 546 exists between the segments. Alternatively, when there is no physical separation in the space within a distal end 551 (e.g., distal end 551-2), a body 552 (e.g., body 552-1), and or a base 553 (e.g., base 553-3) of the signal guide 550, the channel 555 (e.g., channel 555-2) can be used to transmit one or more signals from/to one or more transceiver elements of one or more sensors. If the channel 555 is used to transmit signals to/from multiple transceiver elements, then the channel 555 can be a single open space or multiple spaces within the channel 555 that are physically separated from each other.

Using the signal guide 550, the only part of a sensor device that would be visible to a user are the outlet channels 556 of the signal guide 550. As a result, the footprint (and in particular the visible footprint) of the sensor device can be significantly decreased relative to the footprint of sensor devices currently known in the art. In such a case, the proximal apertures 554 of the base 553 can redirect energy waves or other signals emitted by transceiver elements that are spread out in the housing of the sensor device to the main channels 555 and on to the distal apertures 556, which are spaced relatively close together.

The various characteristics (e.g., cross-sectional shape, cross-sectional size, overall shape, overall size, vertical length, overall length, number of proximal apertures, number of main channels, number of distal apertures) of the signal guide 550 (or any portion thereof) can vary. For example, in this case, the cross-sectional shape of the main channels 555 of the signal guide 550 is rectangular and substantially uniform in shape and size along the entire length of the main channels 555. This makes each body 552 appear as an extruded rectangle. Examples of the cross-sectional shape of a channel, including the main channel 555, the distal aperture 556, and/or the proximal aperture 554, can include, but are not limited to, circular, square, triangular, hexagonal, and irregular.

The cross-sectional shape and/or size of one channel can be the same as, or different than, the cross-sectional shape and/or size of one or more other channels of the signal guide 550. Also, while the main channel 555, the distal aperture 556, and the proximal aperture 554 of the signal guide 550 of FIGS. 5A and 5B are substantially linear and parallel to each other, one or more of the channels can be non-linear along their length, and/or one or more of the channels can be non-linear with respect to each other.

In addition, or in the alternative, the cross-sectional shape and/or size of a body 552 can vary along its length. Also, the cross-sectional shape and/or size of one body 552 can be the same as, or different than, the cross-sectional shape and/or size of one or more other bodies 552 of the signal guide 550. Similarly, the cross-sectional shape and size of the optional base 553 can vary. Also, while the body 552 and the base 553 of the signal guide 550 of FIGS. 5A and 5B are substantially linear and parallel to each other, one or more of the bodies 552 and/or the base 553 can be non-linear along their length, and/or one or more of the bodies 552 and the base 553 can be non-linear with respect to each other. In this case, the channels and the corresponding portions (e.g., body 552, base 553, distal end 551) of the signal guide 550 in which the channel is disposed have substantially the same cross-sectional shape.

FIG. 6 shows a bottom-side perspective view of a sensor device 605 that includes another signal guide 650. The sensor device 605 is substantially similar to the sensor devices (e.g., sensor device 205) described above, except for the signal guide 650. The signal guide 650 of FIG. 6 can be substantially similar to the signal guide 550 of FIGS. 5A and 5B, except as described below. In this case, the signal guide 650 is cylindrical in shape with a cavity 646 that traverse the length of the signal guide 650 through the middle of the cylinder. The signal guide 650 of FIG. 6 can include a proximal end that includes at least one proximal aperture 654. The proximal aperture 654 can be continuous along the surface of the base 653. Alternatively, there can be a number of discrete proximal apertures 654 along the surface of the base 653. The proximal aperture(s) 654 can be disposed proximate to the transceiver elements of the sensor device 605.

The signal guide 650 can also include a distal end 651 that includes one or more distal apertures 656. The distal aperture 656 can be continuous along the surface of the distal end 651. Alternatively, there can be a number of discrete distal apertures 656 along the surface of the distal end 651. In addition, the signal guide 650 can include a body 652 that is disposed between the distal end 651 and the base 651. The body 652 can have one or more main channels 655 disposed therein. When there are multiple channels 655, those channels can be physically separated from each other. Alternatively, when there is no physical separation in the space within the distal end 651, the body 652, and or the base 653 of the signal guide 650, the channel 655 can be used to transmit one or more signals from/to one or more transceiver elements of one or more sensors. The main channels 655 provide continuity between a proximal aperture 654 and a distal aperture 656.

In some cases, the only part of the sensor device 605 and the signal guide 650 that would be visible to a user is the outlet channel 656 of the signal guide 650. As a result, the footprint of the sensor device 605 can be significantly decreased relative to the footprint of sensor devices currently known in the art. In this example, the cross-sectional shape of the signal guide 650 is circular and substantially uniform in shape and size along its entire length. The cross-sectional shape and/or size of the signal guide 650 (or any portion thereof) can vary along its length. For example, the cross-sectional shape of the signal guide 650 (or any portion thereof) can be rectangular, square, triangular, or irregular. Also, while the signal guide 650 of FIG. 6 is substantially linear along its length, the signal guide 650 can be non-linear along its length.

Figure 8A:
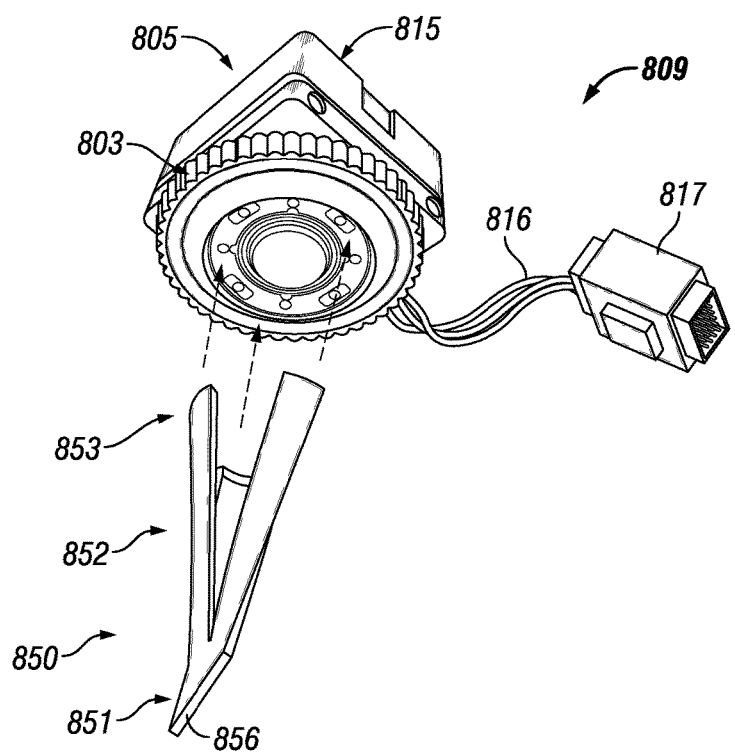
FIGS. 8A and 8B show a sensor device with a signal guide.
Figure 8B:
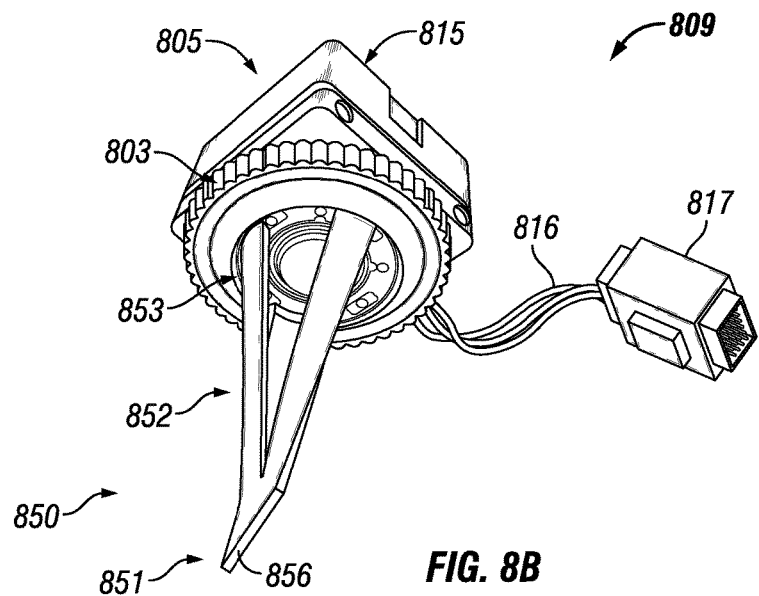
Figure 9C:
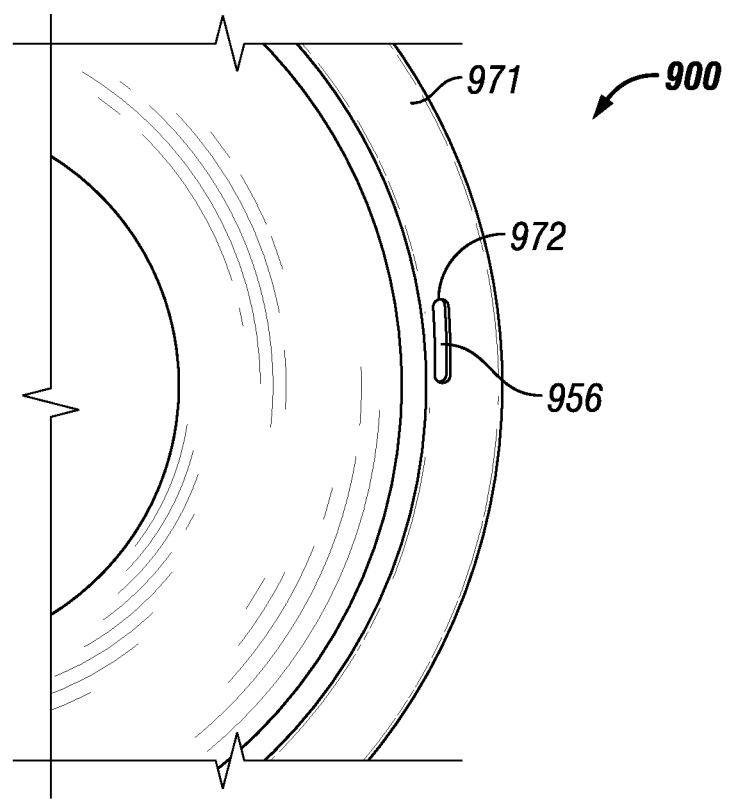

FIGS. 7A-9C show yet another embodiment of a sensor guide 750. Specifically, FIG. 7A shows a side view of a flattened signal guide 750 for a sensor device. FIG. 7B shows a bottom-side perspective view of the signal guide 750 of FIG. 7A that is shaped. FIGS. 8A and 8B each show a bottom-side perspective view of a sensor device 805 that includes a signal guide 850. FIGS. 9A-9C show an electrical device 900 that includes a sensor device 905 (substantially similar to the sensor devices described above) with a signal guide 950.

The signal guide 850 of FIGS. 8A and 8B, the signal guide 750 of FIGS. 7A and 7B, and the signal guide 950 of FIGS. 9A-9C can be substantially similar to the signal guide 530 of FIGS. 5A and 5B and the signal guide 640 of FIG. 6, as well as to each other, except as described below. In addition, aside from the signal guides, the sensor device 805 of FIGS. 8A and 8B and the sensor device 905 of FIGS. 9A-9C are substantially the same as the sensor devices described above. Referring to FIGS. 1A-9C, the signal guide 750 of FIGS. 7A and 7B has a base 753 that is configured to be disposed proximate to the circuit board assembly. Specifically, the base 753 at the proximal end of the signal guide 750 can be disposed adjacent to one or more of the transceiver elements mounted on the circuit board assembly of the sensor device. In this case, the base 753 has a number of proximal apertures 754, where each proximal aperture (e.g., 754-1) is placed adjacent to a transceiver element of the sensor device and receives an energy (e.g., light, sound) wave from the transceiver element.

The signal guide 750 can also include a body 752, located between the base 753 and the distal end 751 of the signal guide 750, where the body includes one or more segments that extend from the base 753. Each segment can have a main channel 755 that extends from the corresponding proximal aperture 754 of the base 753. At the distal end 751 of the body 752 of the signal guide 750, one or more of the main channels 755 merge to form one or more distal apertures 756. In this case, the base 753 of the signal guide 750 has three proximal apertures 754 and three main channels 755, where each proximal aperture 754 and corresponding main channel 755 is designated by a "-#" at the end of each numerical designation. For example, the second proximal aperture has a numerical designation of 754-2.

A proximal aperture 754, a main channel 755, and a distal aperture 756 can form a single continuous channel 780. In this case, proximal aperture 754-1, main channel 755-1, and distal aperture 756-1 forms channel 780-1; proximal aperture 754-2, main channel 755-2, and distal aperture 756-2 forms channel 780-2; and proximal aperture 754-3, main channel 755-3, and distal aperture 756-3 forms channel 780-3. A continuous channel 780 can remain isolated from any other channel 780 of the signal guide 750 along the entire length of the channel 780. Alternatively, a portion (e.g., the distal aperture 756) of a channel 780 can be shared with a corresponding portion of another channel 780 of a signal guide 750.

When multiple main channels 755 merge at the distal end 751, the merger can result in a single distal aperture 756. Alternatively, the merger of multiple main channels 755 at the distal end 751 of the signal guide 750 can result in a more consolidated configuration of the multiple main channels 755 to form the same number of multiple distal apertures 756 at the distal end 751. For example, in this case, distal aperture 756-1, distal aperture 756-2, and distal aperture 756-3, which correspond to main channel 755-1, main channel 755-2, and main channel 755-3, respectively, are located adjacent to each other in a line at the distal end 751 of the signal guide 750 of FIGS. 7A and 7B.

The signal guide 850 of FIGS. 8A and 8B is substantially the same as the shaped signal guide 750 of FIG. 7B. In FIGS. 8A and 8B, the subsystem 809 includes a signal guide 850 and a sensor device 805. The distal end 851 of the signal guide 850 is shown as having a single distal aperture 856. Alternatively, signal guide 850 can have multiple distal apertures 856. For example, there can be one distal aperture 856 for each main channel 855, where the multiple distal apertures 856 are aligned in a row so that the distal end 851 of the signal guide 850 forms a linear segment.

The signal guide 950 of FIGS. 9A-9C is substantially the same as the signal guide 850 of FIGS. 8A and 8B, except that the main channels (main channel 955-1, main channel 955-2, and main channel 955-3) of the body 952 have more curvature than the main channels of the body of the signal guide 850. In FIGS. 9A-9C, all of the sensor device 905, including the signal guide 950, is located behind the trim 971 of the electrical device 900. Further, the distal aperture 956 of the signal guide 950 is disposed within a slot 972 that traverses the trim 971 of the electrical device 900. The shape and size of the slot 972 can be substantially the same as the shape and size of the distal aperture 956. As a result, none of the sensor 900 except for the outlet channel 956 is visible by a user when the electrical device 900 is installed.

This example of FIGS. 9A-9C highlights some advantages of using these sensor guides. First, the size of the sensor device 900 is much less relevant because the sensor device 900 is located where substantial space exists. Consequently, a sensor device 900 of any size (and having any of a number of transceiver elements) can be used with the electrical device 900. Second, none of the sensor device 900 is visible by a user when the electrical device is installed, and so there are no issues with aesthetics. Finally, some signal guides, such as signal guide 950, can be bi-directional, allowing energy waves to flow both from a transceiver element and to a transceiver element (or some other component of the electrical device).

As stated above, regardless of the number (e.g., one, two, four) of sensor in a sensor device, and regardless of whether a sensor of a sensor device uses a signal guide, one or more components (e.g., light source) of the sensor device can distort a reading and/or transmission of a signal by a sensor of the sensor device. To reduce or eliminate this distortion (these adverse effects) caused by such other components, example signal barriers can be used.

Figure 10A:
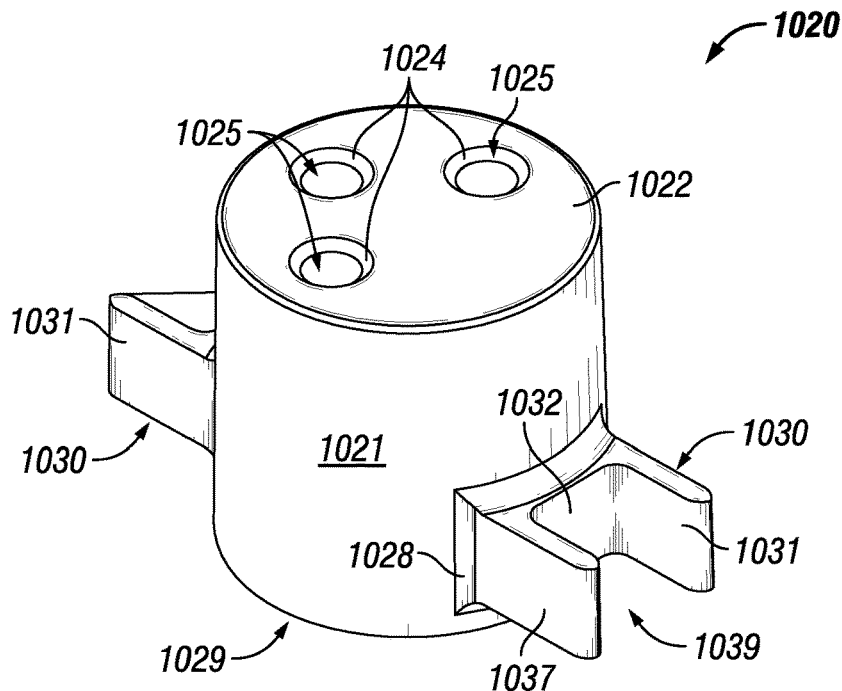
FIGS. 10A-10D show a subassembly that includes a signal barrier in accordance with certain example embodiments.
Figure 10B:
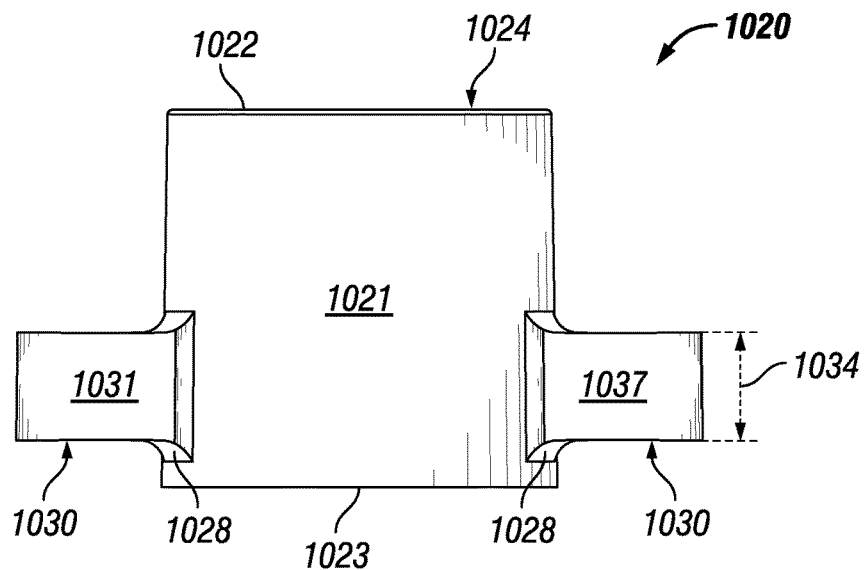
Figure 10C:
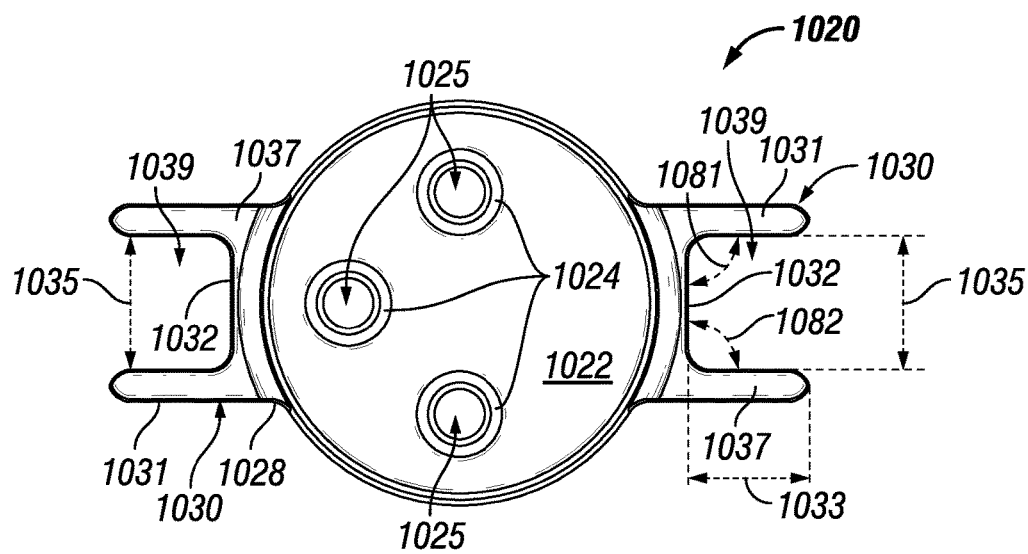
Figure 10D:
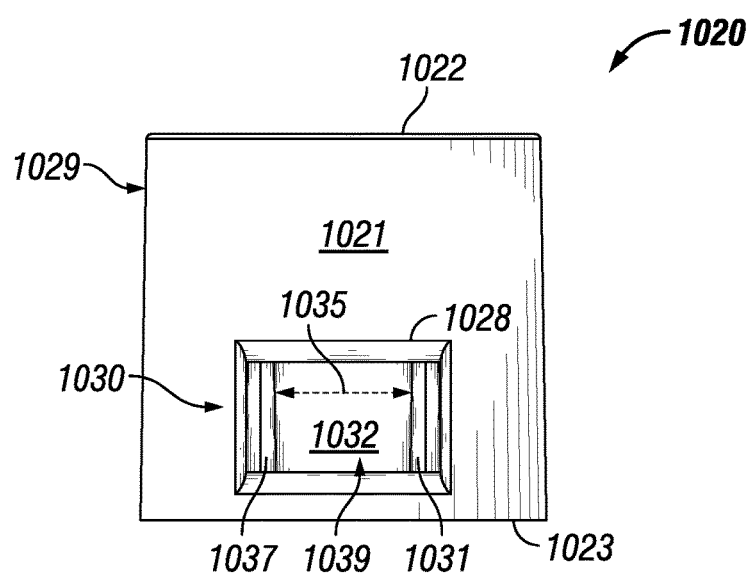

FIGS. 10A-10D show a subassembly 1020 that includes a signal barrier in accordance with certain example embodiments. Specifically, FIG. 10A shows a top-side-front perspective view of the subassembly 1020. FIG. 10B shows a side view of the subassembly 1020. FIG. 10C shows a top view of the subassembly 1020. FIG. 10D shows a front view of the subassembly 1020. The subassembly 1020 includes a housing 1029 and two signal barriers 1030 coupled to the housing 1029.

The housing 1029 can be a separate component (e.g., detachably coupled) relative to one or both of the signal barriers 1030. Alternatively, the housing 1029 can be integral (e.g., as from a mold) with one or both of the signal barriers 1030. In this case, the housing 1029 and the two signal barriers 1030 are integral with each other, and a transitional feature 1028 is disposed between the wall 1021 of the housing 1029 and the signal barriers 1030. In this way, each transitional feature 1028 can be considered a coupling feature of the housing 1029 and/or a positioning feature of the signal barriers 1030.

The housing 1029 can have at least one wall 1021, as well as a top side 1022 and a bottom side 1023. The housing 1029 can also include one or more of any of a number of features. For example, in this case, the housing 1029 has one wall 1021 that forms a cylinder. In addition, the housing 1029 of FIGS. 10A-10D has three apertures 1025, defined by edges 1024, that traverse the top side 1022. Also, while in this case the housing 1029 is integral with the two signal barriers 1030 of FIGS. 10A-10D, the housing 1029 can have one or more of a number of coupling features disposed on the wall 1021, where the coupling features couple to positioning features of each of the signal barriers 1030. In such a case, a signal barrier 1030 can be detached from the housing 1029. In addition, or in the alternative, a signal barrier 1030 can be moved relative to the housing 1029 to allow for a desired amount of signal blockage for a transceiver of a sensor.

In this example, the two signal barriers 1030 are substantially identical to each other, although in other embodiments, when there are multiple signal barriers 1030, one signal barrier 1030 can have one or more characteristics (e.g., number of walls, height, length, width, angles, bendability of walls, positioning features) that are different from a corresponding characteristic of one or more other signal barriers 1030.

A signal barrier 1030 can have one or more walls (e.g., left side wall 1037, right side wall 1031, back wall 1032). Each wall can have a height 1034 that is substantially the same, or variable, along its length (e.g., length 1033 of side wall 1031, length 1035 of back wall 1032). When there are multiple walls, adjacent walls can form angles relative to each other. For example, right side wall 1031 and back wall 1032 form angle 1081, and left side wall 1037 and back wall 1032 form angle 1082. In this case, angle 1081 and angle 1082 are each approximately 90°.

When the angles formed by the walls of a signal barrier 1030 are approximately 90°, then the lengths (e.g., length 1033, length 1035) of the walls can also represent a width formed by opposing walls. For example, in FIGS. 10A-10D, the length 1035 of back wall 1032 is substantially the same as the width 1035 between left side wall 1037 and right side wall 1031.

The walls of a signal barrier 1030 can form an inner space 1039. The inner space 1039 can be substantially enclosed. Alternatively, the inner space 1039 can have at least one open end. In this example, the inner space 1039 is open at the top, at the bottom, and at the side opposite the back wall 1032. In this way, the inner space 1039 can extend, to some extent, beyond the walls (e.g., the distal end of the side walls 1031, the bottom of the side walls 1031 and the back wall 1032, the top of the side walls 1031 and the back wall 1032) of a signal barrier 1030. In certain example embodiments, a transceiver element of a sensor is then directed toward at least a portion of the inner space 1039. In other words, the transceiver element of a sensor can be physically disposed within the inner space 1039. Alternatively, the transceiver element of a sensor can be physically disposed adjacent to the inner space 1039.

Each wall (or portions thereof) of a signal barrier 1030 can be made of one or more of a number of materials. Such materials can include, but are not limited to, plastic, metal, ceramic, and rubber. In addition, or in the alternative, a wall (or portions thereof) of a signal barrier 1030 can have any of a number of stiffness characteristics. Examples of such characteristics of a wall of a signal barrier 1030 can include, but are not limited to, rigid, semi-rigid, malleable, bendable, and flexible with resiliency. In addition, or in the alternative, a wall (or portions thereof) of a signal barrier 1030 can have a coating and/or be made of a material having certain properties. Examples of such properties can include, but are not limited to, reflect visible light, absorb visible light, deflect x-rays, and deflect radio waves.

As discussed above, a signal barrier 1030 can include one or more of a number of positioning features (e.g., transitional feature 1028). Also, as discussed and defined above, a positioning feature can be considered a coupling feature (e.g., protrusion, tab, detent, slot, clip, aperture). A positioning feature of a signal barrier 1030 can be located at any point of any portion of a signal barrier 1030. For example, a positioning feature can be located on the outer surface of the back wall 1032. As another example, a positioning feature can be located on the bottom surface of a side wall 1031. A positioning feature can couple, directly or indirectly, to a complementary coupling feature of another component (e.g., housing 1029, a capacitor, a standoff) of the sensor device.

Figure 11A:
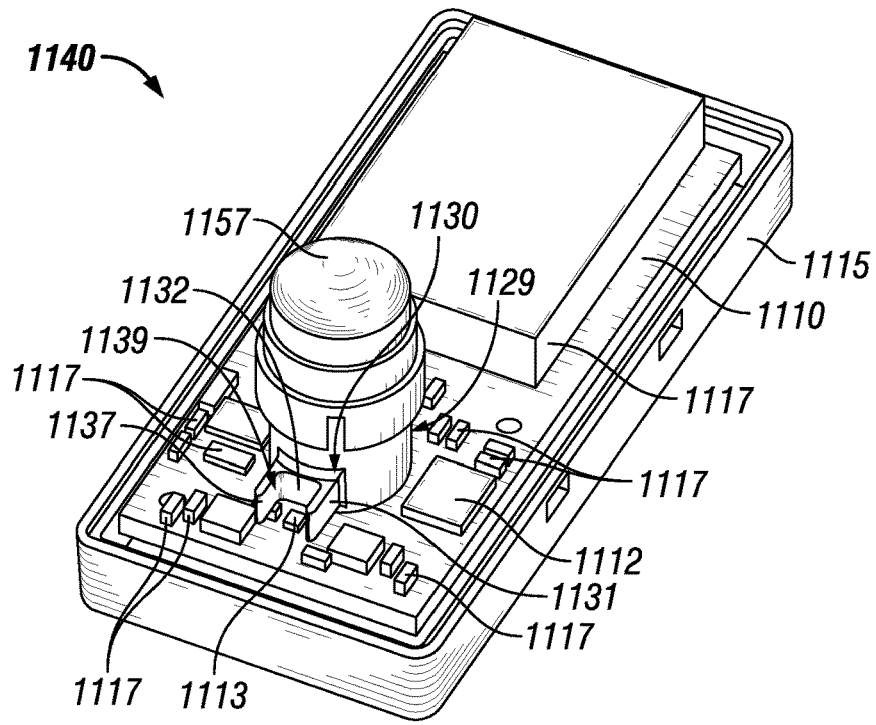
FIGS. 11A-11E show a larger subassembly in accordance with certain example embodiments.
Figure 11B:
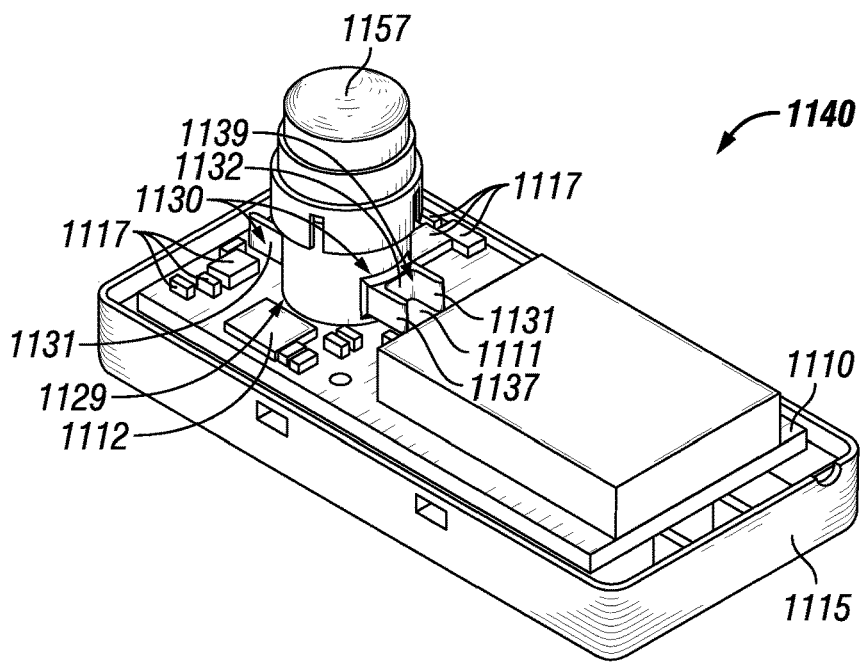
Figure 11C:
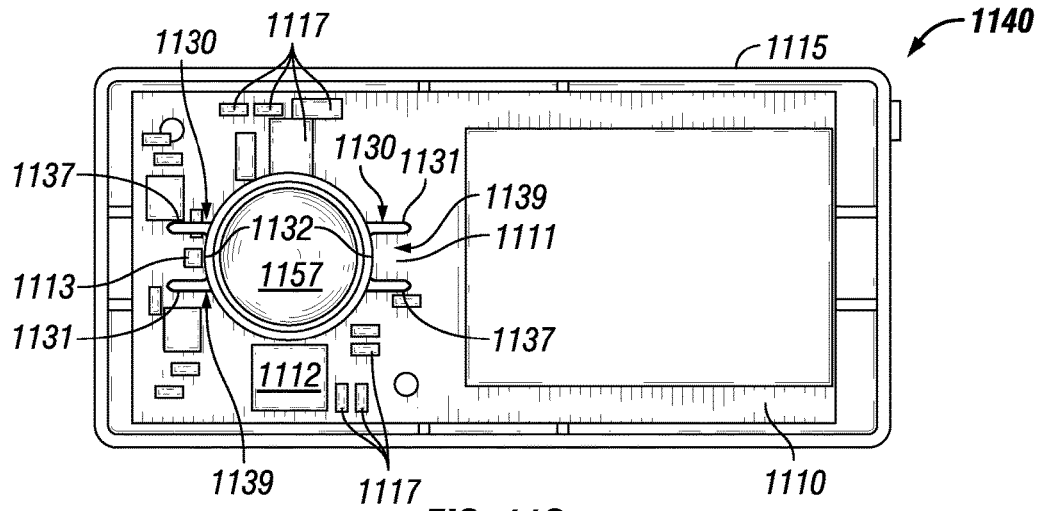
Figure 11D:
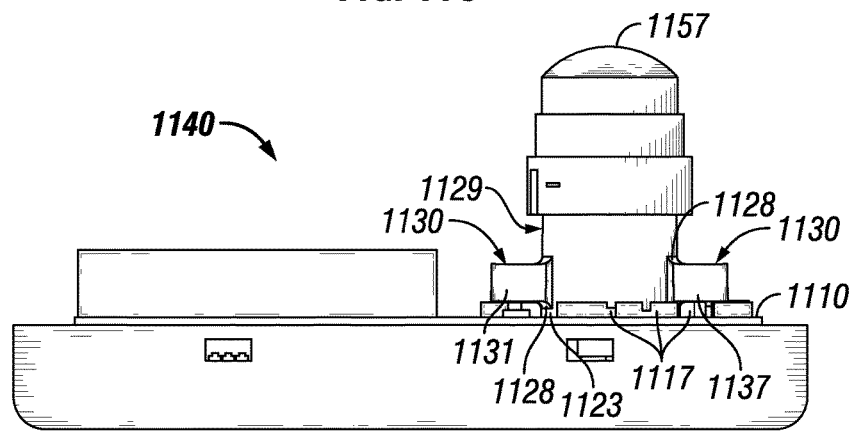
Figure 11E:
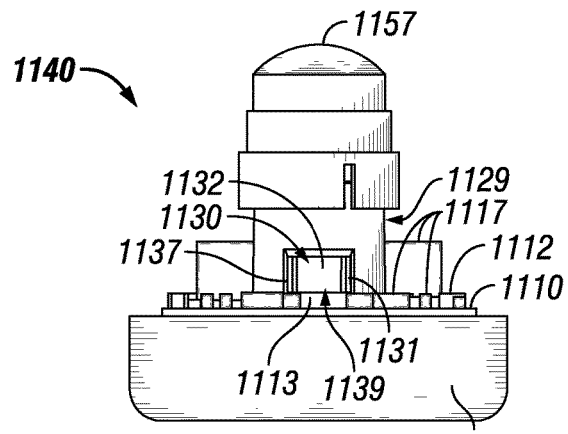

FIGS. 11A-11E show a larger subassembly 1140 in accordance with certain example embodiments. Specifically, FIG. 11A shows a front-side-top perspective view of the subassembly 1140. FIG. 11B shows a rear-side-top perspective view of the subassembly 1140. FIG. 11C shows a top view of the subassembly 1140. FIG. 11D shows a side view of the subassembly 1140. FIG. 11E shows a front view of the subassembly 1140.

The subassembly 1140 of FIGS. 11A-11E includes part of a sensor device housing 1115, a circuit board 1110, and a number of components 1117 disposed on the circuit board 1110, including a lens 1157, an infrared detector 1112 (also called an infrared receiver 1112), a photo sensor 1111, a LED assembly 1113, a housing 1129, and two signal barriers 1130. The signal barriers 1130 and the housing 1129 of FIGS. 11A-11E can be substantially the same as the signal barriers 1030 and the housing 1029 of FIGS. 10A-10D described above. Similarly, the housing 1115, the circuit board 1110, and the components 1117 (including the lens 1157, the infrared detector 1112, the photo sensor 1111, and the LED assembly 1113) of FIGS. 11A-11E can be substantially the same as the corresponding components described above with respect to FIGS. 1A-4B.

In this case, the transceiver (LED) of the LED assembly 1113 is positioned within the inner space 1039 of one of the signal barriers 1130, and the transceiver of the photo sensor 1111 is positioned within the inner space 1039 of the other signal barrier 1130. There is no signal barrier associated with the transceiver of the infrared detector 1112 in this case. When the rest of the housing 1115 of the sensor device is assembled, signals (e.g., visible light) generated by a component 1117 can be reflected within the housing 1115 and detected by a sensor (e.g., the infrared detector 1112, the photo sensor 1111) of the sensor device. When this occurs, the sensor can make an incorrect measurement. Thus, using example signal barriers 1130 can help isolate the signal generated by a component 1117 and/or prevent (or reduce the amount of) such a signal from reaching the transceiver of a sensor device, either of which improve the accuracy of the sensor reading.

Figure 12A:
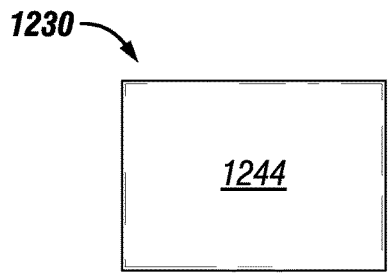
FIGS. 12A and 12B show another signal barrier in accordance with certain example embodiments.
Figure 12B:
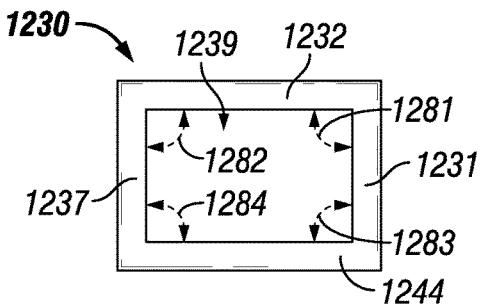

FIGS. 12A and 12B show another signal barrier 1230 in accordance with certain example embodiments. Specifically, FIG. 12A shows a front view of the signal barrier 1230. FIG. 12B shows a top view of the signal barrier 1230. The signal barrier 1230 of FIGS. 12A and 12B are substantially the same as the signal barriers 1030 of FIGS. 10A-10D, except that the signal barrier 1230 of FIGS. 12A and 12B include a front wall 1244 in addition to the left side wall 1237, the right side wall 1231, and the back wall 1232.

In this case, the front wall 1244 is disposed at the distal end of the left side wall 1237 and the right side wall 1231. The front wall 1244 forms angle 1283 with the right side wall 1231, and the front wall 1244 forms angle 1284 with the right side wall 1231. In this case, angle 1283 and angle 1284, like angle 1281 and angle 1282, are each approximately 90°. The inner space 1239 is thus closed except for above and below the walls of the signal barrier 1230.

Figure 13:
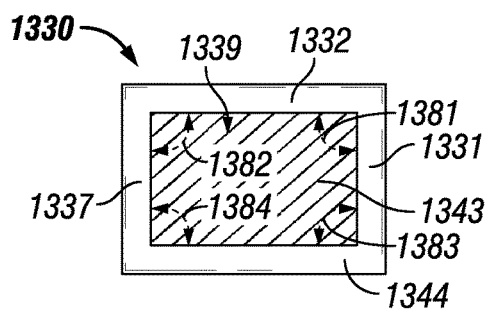
FIG. 13 shows yet another signal barrier in accordance with certain example embodiments.

FIG. 13 shows a top view of yet another signal barrier 1330 in accordance with certain example embodiments. The signal barrier 1330 of FIG. 13 is substantially the same as the signal barrier 1230 of FIGS. 12A and 12B, except that the signal barrier 1330 of FIG. 13 includes a bottom wall 1343 in addition to the front wall 1344, the back wall 1332, the left side wall 1337, and right side wall 1331. The bottom wall 1343 is disposed at the bottom side of the front wall 1344, the back wall 1332, the left side wall 1337, and the right side wall 1331. Angle 1281, angle 1282, angle 1383, and angle 1384 continue to each be approximately 90°. Further, the inner space 1339 in this case is now closed except for above the walls of the signal barrier 1330.

Figure 14:
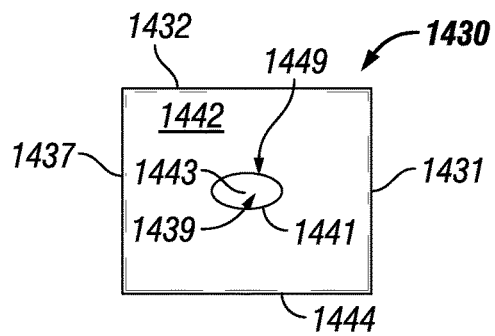
FIG. 14 shows still another signal barrier in accordance with certain example embodiments.

FIG. 14 shows a top view of still another signal barrier 1430 in accordance with certain example embodiments. The signal barrier 1430 of FIG. 14 is substantially the same as the signal barrier 1330 of FIG. 13, except that the signal barrier 1430 of FIG. 14 includes a top wall 1442 in addition to the bottom wall 1443, the front wall 1444, the back wall 1432, the left side wall 1437, and right side wall 1431. The top wall 1442 is disposed at the top side of the front wall 1444, the back wall 1432, the left side wall 1437, and the right side wall 1431.

The top wall 1442 is solid except for an aperture 1449 that traverses therethrough. The aperture 1449 in the top wall 1442 is substantially circular in shape, is relatively small in size, and is formed by an edge 1441. The shape and size of the edge 1441 that forms the aperture 1449 in the top wall 1442 can be configured to receive a base of a signal guide (as described above), or some other component that can aid in transmitting a signal to and/or from the transceiver of a sensor. In other words, the aperture 1449 can have any of a number of shapes (e.g., circular, oval, square, rectangular, triangular, octagonal, random) and/or sizes. In this case, the inner space 1439 in this case is now completely closed except for the aperture 1449 in the top wall 1442. When an object (e.g., a base of a signal guide) is disposed in the aperture 1449 in the top wall 1442, then the inner space 1439 can be substantially completely enclosed.

Figure 15:
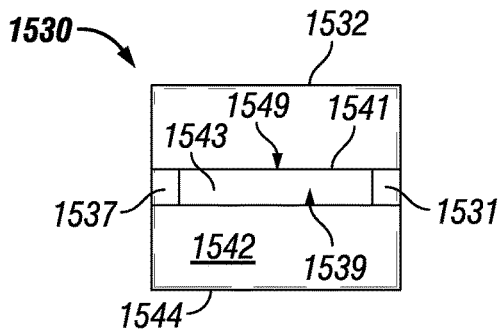
FIG. 15 shows yet another signal barrier in accordance with certain example embodiments.

FIG. 15 shows a top view of yet another signal barrier 1530 in accordance with certain example embodiments. In this case, the signal barrier 1530 of FIG. 15 is substantially the same as the signal barrier 1430 of FIG. 14, except that in this case, the aperture 1549 that traverses the top wall 1542 is rectangular in shape and traverses the entire width of the top wall 1542. In this way, the top wall 1542 is divided into two separate portions, and portions of top ends of the left side wall 1537 and the right side wall 1531 are exposed to the inner space 1539. In other words, the shape of the aperture 1549 in the top wall 1542 is an elongated rectangle, and the size of the aperture 1549 is the width of the top wall 1542.

Figure 16:
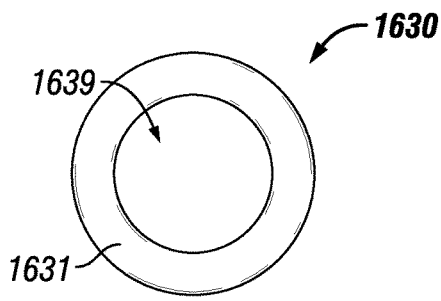
FIG. 16 shows still another signal barrier in accordance with certain example embodiments.

FIG. 16 shows a top view of still another signal barrier 1630 in accordance with certain example embodiments. In this case, there is only one wall 1631 that forms a cylinder, inside of which is the inner space 1639. There is no top wall or bottom wall in this case, and so the inner space 1639 extends above and below the wall 1631 within the cylinder.

Figure 17A:
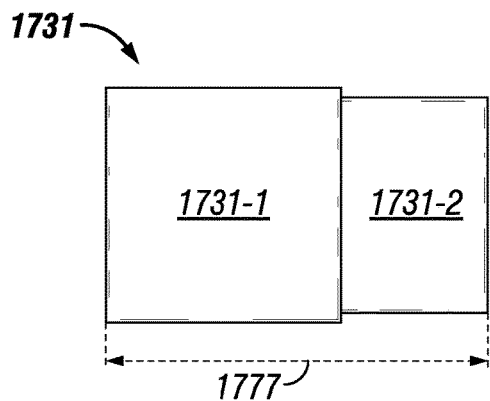
FIGS. 17A and 17B show yet another signal barrier in accordance with certain example embodiments.
Figure 17B:
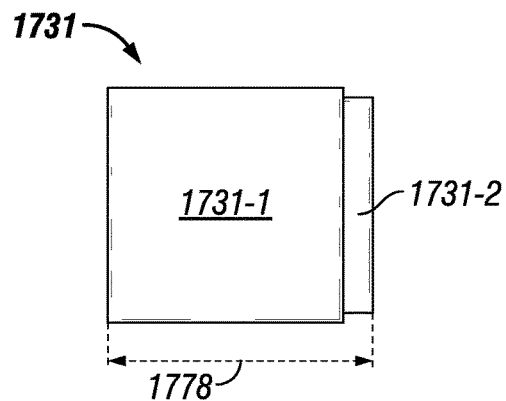

As discussed above, one or more dimensions (e.g., height, length, thickness, curvature) of one or more walls of an example signal barrier can be adjustable. For example, FIGS. 17A and 17B show a side wall 1731 of a signal barrier in accordance with certain example embodiments. Specifically, the side wall 1731 has two portions (side wall portion 1731-1 and side wall portion 1731-2) that move (e.g., slide) relative to each other so that the length of the side wall 1731 can be adjusted. In this case, side wall portion 1731-1 and side wall portion 1731-2 can be positioned with respect to each other to result in a maximum length 1777 of the side wall 1731, as shown in FIG. 17A. Conversely, side wall portion 1731-1 and side wall portion 1731-2 can be positioned with respect to each other to result in a minimum length 1778 of the side wall 1731, as shown in FIG. 17A.

While this example shows how the length of the side wall 1731 can be adjusted, other dimensions (e.g., height, thickness, curvature) of the side wall 1731 can also be adjusted in other example embodiments in similar or other manners. Further, one or more dimensions of one or more other walls (e.g., back wall) of a signal barrier can be adjusted in certain example embodiments.

Figure 18A:
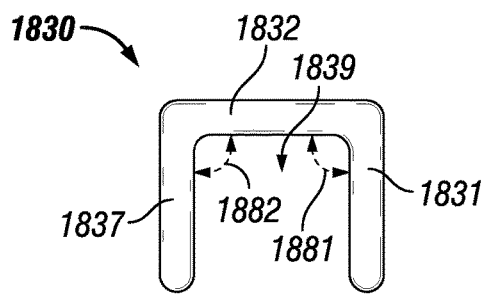
FIGS. 18A and 18B show still another signal barrier in accordance with certain example embodiments.
Figure 18B:
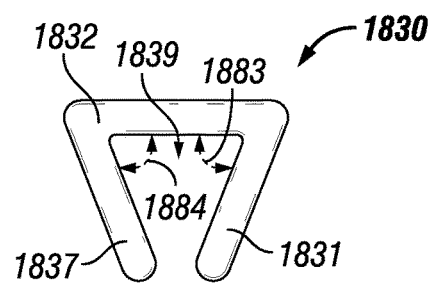

FIGS. 18A and 18B show top views of yet another signal barrier 1830 in accordance with certain example embodiments. In this case, the left side wall 1837 and the right side wall 1831 are bendable relative to the back wall 1832. As a result, angle 1881 (shown in FIG. 18A) between the right side wall 1831 and the back wall 1832 can be adjusted (e.g., increased, decreased) to angle 1883 (shown in FIG. 18B). Similarly, angle 1882 (shown in FIG. 18A) between the left side wall 1837 and the back wall 1832 can be adjusted (e.g., increased, decreased) to angle 1884 (shown in FIG. 18B).

Example embodiments provide a number of benefits. Examples of such benefits include, but are not limited to, a defined field of disbursement, reduction in visible footprint; more simplistic installation, replacement, modification, and maintenance of a sensor device; improved aesthetics; ability to transmit energy waves in two directions rather than just one direction; compliance with one or more applicable standards and/or regulations; lower maintenance costs, increased flexibility in system design and implementation; and reduced cost of labor and materials. Example embodiments can be used for installations of new electrical devices and/or new sensor devices. Example embodiments can also be integrated (e.g., retrofitted) with existing electrical devices and/or sensor devices.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A signal barrier for a sensor device, wherein the signal barrier comprises at least one wall that forms an inner space, wherein the at least one wall comprises a reflective material, wherein the signal barrier is configured to prevent an extraneous signal from entering the inner space, wherein the signal barrier is further configured to allow an intended signal within the inner space, wherein the at least one wall is configured to be disposed adjacent to a transceiver element of the sensor device, wherein the transceiver element is directed toward the inner space to transceive the intended signal without being distorted by the extraneous signal, wherein the signal barrier comprises at least one positioning feature disposed adjacent to the at least one wall, wherein the at least one positioning feature is configured to couple to a component of the sensor device, and wherein the at least one positioning feature, when coupled to the component of the sensor device, places the at least one wall in a certain position relative to the transceiver element of the sensor device.

2. The signal barrier of claim 1, wherein the at least one wall comprises a vertical component.

3. The signal barrier of claim 1, wherein the inner space is partially open.

4. The signal barrier of claim 1, wherein the reflective material reflects light waves.

5. The signal barrier of claim 1, wherein the at least one wall is further configured to receive a signal guide that transmits signals with the transceiver element of the sensor device.

6. The signal barrier of claim 1, wherein the at least one positioning feature is removably coupled to the component of the sensor device so that a user can adjust the at least one positioning feature relative to the component of the sensor device.

7. The signal barrier of claim 1, wherein the component is configured to couple to at least one additional signal barrier while coupled to the at least one wall.

8. The signal barrier of claim 1, wherein the at least one wall is adjustable to alter a dimension of the inner space.

9. A sensor device, comprising:
   a first sensor comprising a first transceiver element that receives a first signal from a first external source;
   a first component that generates a second signal, wherein the second signal is transmitted proximate to the first transceiver element;
   a first signal barrier disposed proximate to the first transceiver element, wherein the first signal barrier comprises at least one first wall that forms a first inner space, wherein the at least one first wall comprises a first reflective material, wherein the first signal barrier prevents the second signal from entering the first inner space, wherein the first signal barrier further allows the first signal within the first inner space, wherein the first transceiver element is directed toward the first inner space to receive the first signal without being distorted by the second signal, and
   a second component comprising at least one first coupling feature, wherein the at least one first coupling feature couples to at least one first positioning feature of the first signal barrier, wherein the at least one first positioning feature, when coupled to the second component, places the at least one first wall in a certain position relative to the first transceiver element of the first sensor.

10. The sensor device of claim 9, wherein the at least one first positioning feature is movably coupled to the second component so that a user can adjust the at least one first positioning feature relative to the second component.

11. The sensor device of claim 10, wherein the first signal barrier is adjustable vertically relative to a circuit board on which the first sensor and the second component are disposed.

12. The sensor device of claim 10, wherein the first signal barrier is adjustable horizontally relative to a circuit board on which the first sensor and the second component are disposed.

13. The sensor device of claim 9, further comprising:
   a second sensor comprising a second transceiver element that receives a third signal from a second external source; and
   a second signal barrier disposed proximate to the first transceiver element, wherein the second signal barrier comprises at least one second wall that forms a second inner space, wherein the at least one second wall comprises a second reflective material, wherein the second signal barrier prevents the first signal and the second signal from entering the second inner space, wherein the second transceiver element is directed toward the second inner space to receive the third signal without being distorted by the first signal or the second signal.

14. The sensor device of claim 13, wherein the second component further comprises at least one second coupling feature, wherein the at least one second coupling feature couples to at least one second positioning feature of the second signal barrier, wherein the at least one second positioning feature, when coupled to the second component, places the at least one second wall in a certain position relative to the second transceiver element of the second sensor.

* * * * *